United States Patent
Denby et al.

(10) Patent No.: US 12,128,920 B2
(45) Date of Patent: Oct. 29, 2024

(54) METHOD AND SYSTEM FOR PRODUCING AN ENVIRONMENTAL AWARENESS FOR ALERTING AN OPERATOR OF A VEHICLE

(71) Applicant: Roadio, Inc., San Francisco, CA (US)

(72) Inventors: Jonathan Denby, San Francisco, CA (US); William S. Murphy, San Francisco, CA (US)

(73) Assignee: Roadio, Inc., San Francisco, CA (US)

( * ) Notice: Subject to any disclaimer, the term of this patent is extended or adjusted under 35 U.S.C. 154(b) by 0 days.

(21) Appl. No.: 18/617,216

(22) Filed: Mar. 26, 2024

(65) Prior Publication Data

US 2024/0326858 A1    Oct. 3, 2024

Related U.S. Application Data

(60) Provisional application No. 63/598,406, filed on Nov. 13, 2023, provisional application No. 63/493,916, filed on Apr. 3, 2023.

(51) Int. Cl.
*B60Q 1/00*     (2006.01)
*B60W 30/095*   (2012.01)
(Continued)

(52) U.S. Cl.
CPC ........ *B60W 50/16* (2013.01); *B60W 30/0956* (2013.01); *B60W 50/0097* (2013.01);
(Continued)

(58) Field of Classification Search
CPC ............. B60W 50/16; B60W 30/0956; B60W 50/0097; B60W 2050/143;
(Continued)

(56) References Cited

U.S. PATENT DOCUMENTS 4,798,318 A    1/1989  Irwin
4,921,151 A    5/1990  Duvall
(Continued)

FOREIGN PATENT DOCUMENTS

EP     3807128 B1    1/2024
WO  2021240497 A1   12/2021

OTHER PUBLICATIONS

Denby, Jonathan , et al., "Method and System for Producing an Environmental Awareness for Alerting an Operator of a Vehicle", U.S. Appl. No. 18/617,216, filed Mar. 26, 2024.
(Continued)

*Primary Examiner* — Tai T Nguyen
(74) *Attorney, Agent, or Firm* — Jeffrey Schox; Diana Lin

(57) ABSTRACT

A system for producing an environmental awareness for alerting an operator of a vehicle includes a sensor subsystem. Additionally or alternatively, the system can include and/or interface with any or all of: a vehicle (e.g., bicycle); computing and/or processing subsystem; user interface; user device; output devices; and/or any other components. A method for producing an environmental awareness for alerting an operator of a vehicle includes receiving data from a set of sensors; and analyzing a set of objects in the vehicle's environment. Additionally or alternatively, the method can include any or all of: pre-processing the data; determining a scenario based on the analyzed objects; triggering an action based on the scenario; producing a set of models and/or algorithms; and/or any other suitable processes performed in any suitable order.

20 Claims, 12 Drawing Sheets
(4 of 12 Drawing Sheet(s) Filed in Color)

(51) Int. Cl.
  *B60W 50/00* (2006.01)
  *B60W 50/16* (2020.01)
  *B62J 45/414* (2020.01)
  *B62J 50/22* (2020.01)
  *G06T 7/50* (2017.01)
  *G06V 20/58* (2022.01)
  *B60W 50/14* (2020.01)

(52) U.S. Cl.
  CPC ............ *B62J 45/414* (2020.02); *B62J 50/22* (2020.02); *G06T 7/50* (2017.01); *G06V 20/58* (2022.01); *B60W 2050/143* (2013.01); *B60W 2050/146* (2013.01); *B60W 2300/36* (2013.01); *B60W 2420/403* (2013.01); *B60W 2554/4045* (2020.02); *B60W 2554/80* (2020.02); *G06T 2207/10028* (2013.01); *G06T 2207/30261* (2013.01)

(58) Field of Classification Search
  CPC ....... B60W 2050/146; B60W 2300/36; B60W 2420/403; B60W 2554/4045; B60W 2554/80; B62J 45/414; B62J 50/22; G06T 7/50; G06T 2207/10028; G06T 2207/30261; G06V 20/58
  USPC ........................................................ 340/425
  See application file for complete search history.

(56) References Cited

U.S. PATENT DOCUMENTS

| | | |
|---|---|---|
| 5,634,653 A | 6/1997 | Browning |
| 7,787,857 B2 | 8/2010 | Peterman |
| 8,481,190 B2 | 7/2013 | Kalis et al. |
| 8,774,072 B2 | 7/2014 | Morris et al. |
| 9,195,894 B2 | 11/2015 | Vasquez et al. |
| 9,282,520 B2 | 3/2016 | Morris et al. |
| 9,532,474 B2 | 12/2016 | Gutschenritter et al. |
| 9,676,441 B2 | 6/2017 | Chen et al. |
| 9,868,394 B1 | 1/2018 | Fields et al. |
| 10,106,083 B1 | 10/2018 | Fields et al. |
| 10,182,222 B2 | 1/2019 | Hesla et al. |
| 10,343,605 B1 | 7/2019 | Fields et al. |
| 10,360,910 B2 | 7/2019 | Valentine et al. |
| 10,393,872 B2 | 8/2019 | Brisimitzakis et al. |
| 10,469,751 B2 | 11/2019 | Wissenbach et al. |
| 10,527,722 B2 | 1/2020 | Carlson et al. |
| 10,786,028 B2 | 9/2020 | Cech et al. |
| 11,105,920 B2 | 8/2021 | Brisimitzakis et al. |
| 11,254,386 B2 | 2/2022 | Isenschmid et al. |
| 11,702,068 B2 | 7/2023 | Jin et al. |
| 11,710,421 B2 | 7/2023 | Spence et al. |
| 11,710,422 B2 | 7/2023 | Spence et al. |
| 2014/0233795 A1 | 8/2014 | Omino |
| 2015/0035685 A1 | 2/2015 | Stickland et al. |
| 2016/0086040 A1 | 3/2016 | Kuehnle et al. |
| 2017/0309174 A1 | 10/2017 | Gonzales et al. |
| 2018/0338117 A1 | 11/2018 | Park et al. |
| 2020/0223434 A1 | 7/2020 | Campos Macias et al. |
| 2020/0238991 A1 | 7/2020 | Aragon et al. |
| 2021/0139103 A1* | 5/2021 | Gillett ............... B60W 60/0053 |
| 2021/0171026 A1* | 6/2021 | Pfau ................... B60W 30/095 |
| 2021/0300360 A1 | 9/2021 | Sasin et al. |
| 2022/0118906 A1 | 4/2022 | Wang |
| 2022/0222475 A1* | 7/2022 | Oesterling ............. G08G 1/166 |
| 2023/0410525 A1 | 12/2023 | Mohammed et al. |

OTHER PUBLICATIONS

Denby, Jonathan, et al., "Method and System for Providing a Rider with a Dynamic Environmental Awareness", U.S. Appl. No. 18/616,688, filed Mar. 26, 2024.

* cited by examiner

S500 (triggering actions at user interface)

passive "scanning" mode

1 Side / Front Collision Warning

"Watch left"

2 Rear Approach Warning

"Car back"

3 Incident Recording

METHOD AND SYSTEM FOR PRODUCING AN ENVIRONMENTAL AWARENESS FOR ALERTING AN OPERATOR OF A VEHICLE

CROSS-REFERENCE TO RELATED APPLICATIONS

This application claims the benefit of U.S. Provisional Application No. 63/493,916, filed 3 Apr. 2023, and U.S. Provisional Application No. 63/598,406, filed 13 Nov. 2023, each of which is incorporated in its entirety by this reference.

TECHNICAL FIELD

This invention relates generally to the image processing and vehicular alert fields, and more specifically to a new and useful system and method for producing an environmental awareness for an operator of a vehicle in the image processing and vehicular alert fields.

BRIEF DESCRIPTION OF THE FIGURES

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
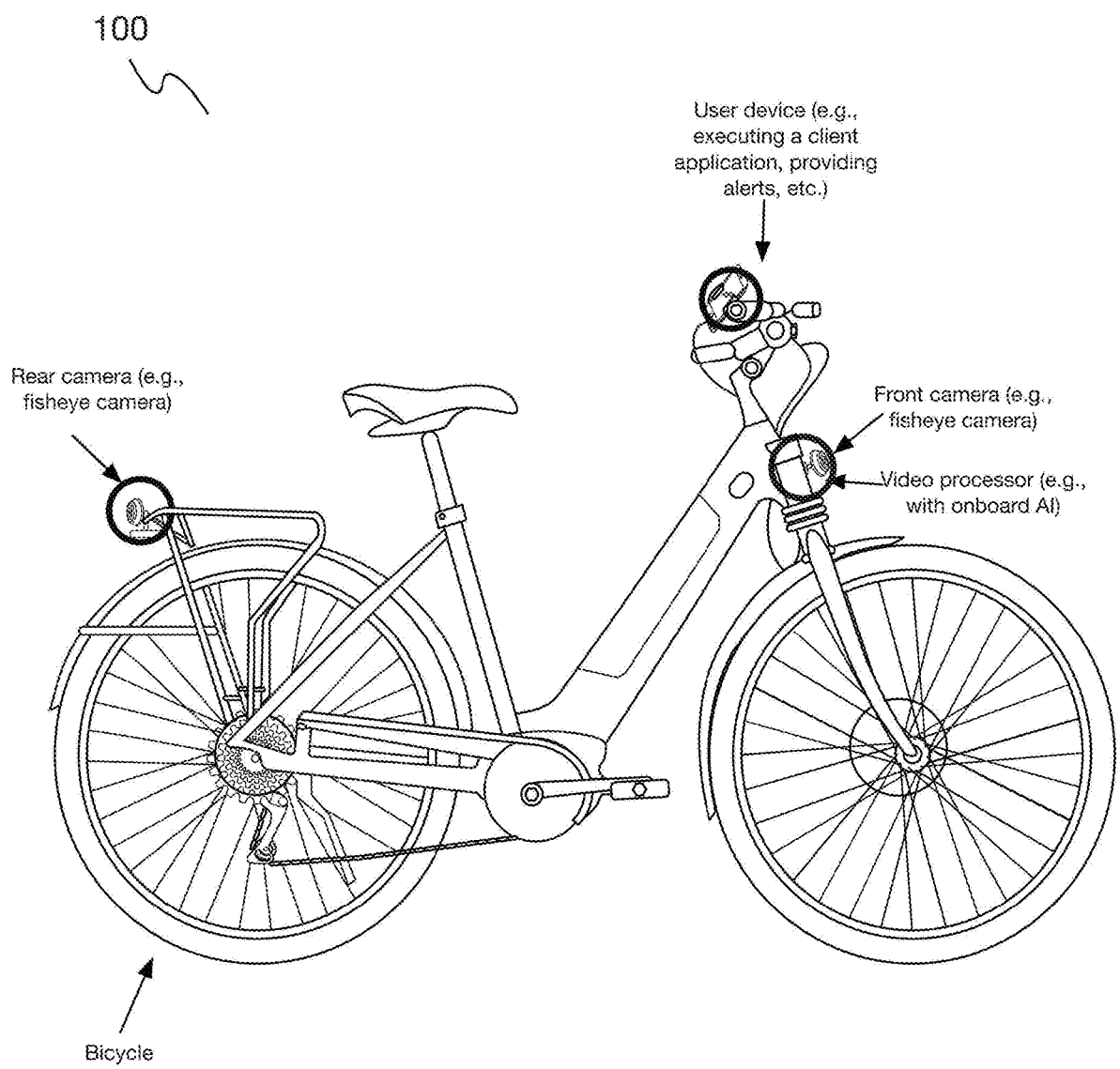
FIGS. 1A-1B are a schematic of a system for producing a 3D environmental representation.
Figure 1B:
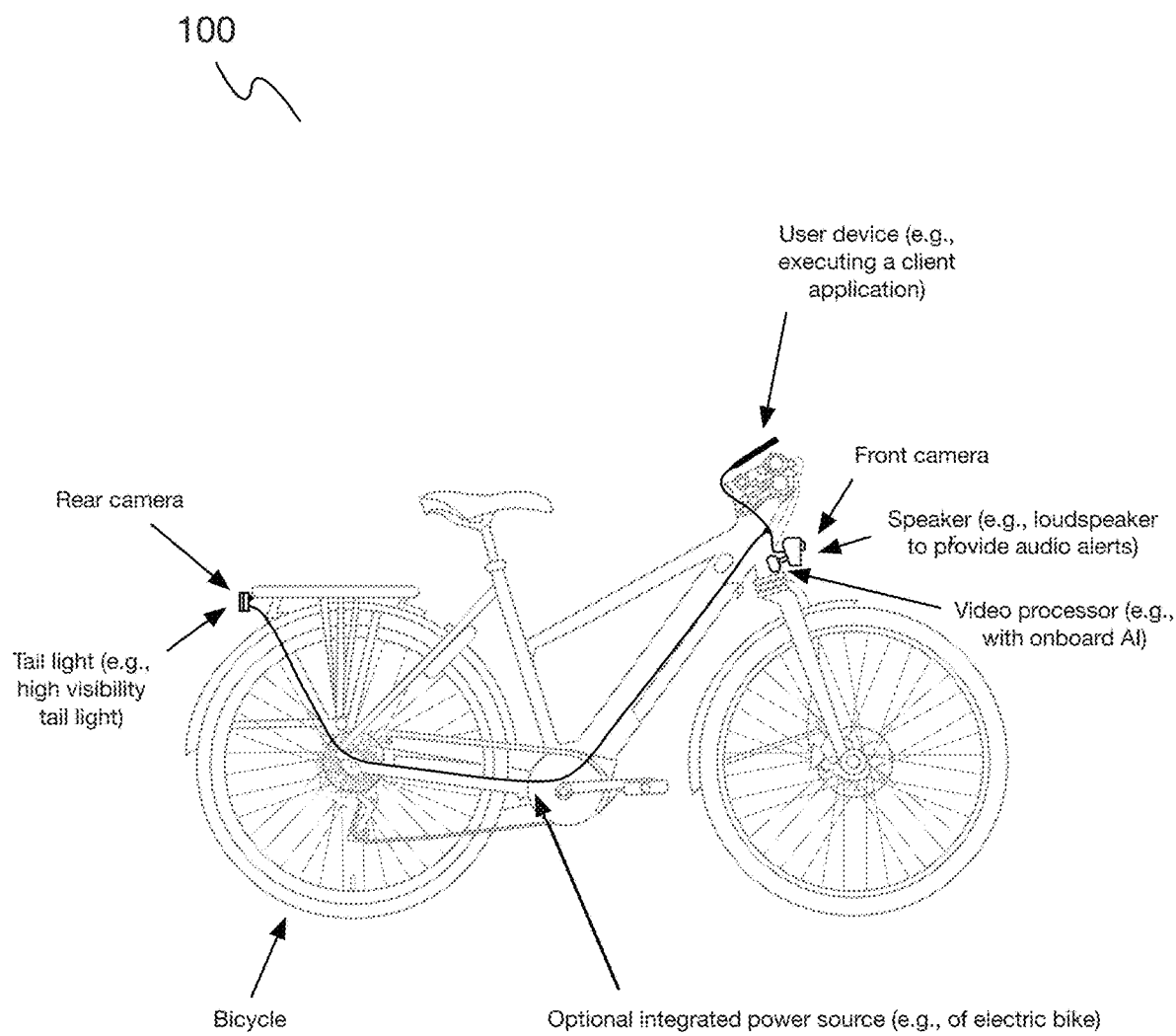

As shown in FIG. 1, a system 100 for producing an environmental awareness for alerting an operator of a vehicle includes a sensor subsystem. Additionally or alternatively, the system 100 can include and/or interface with any or all of: a vehicle (e.g., bicycle); computing and/or processing subsystem; user interface; user device; output devices; and/or any other components.

Figure 2:
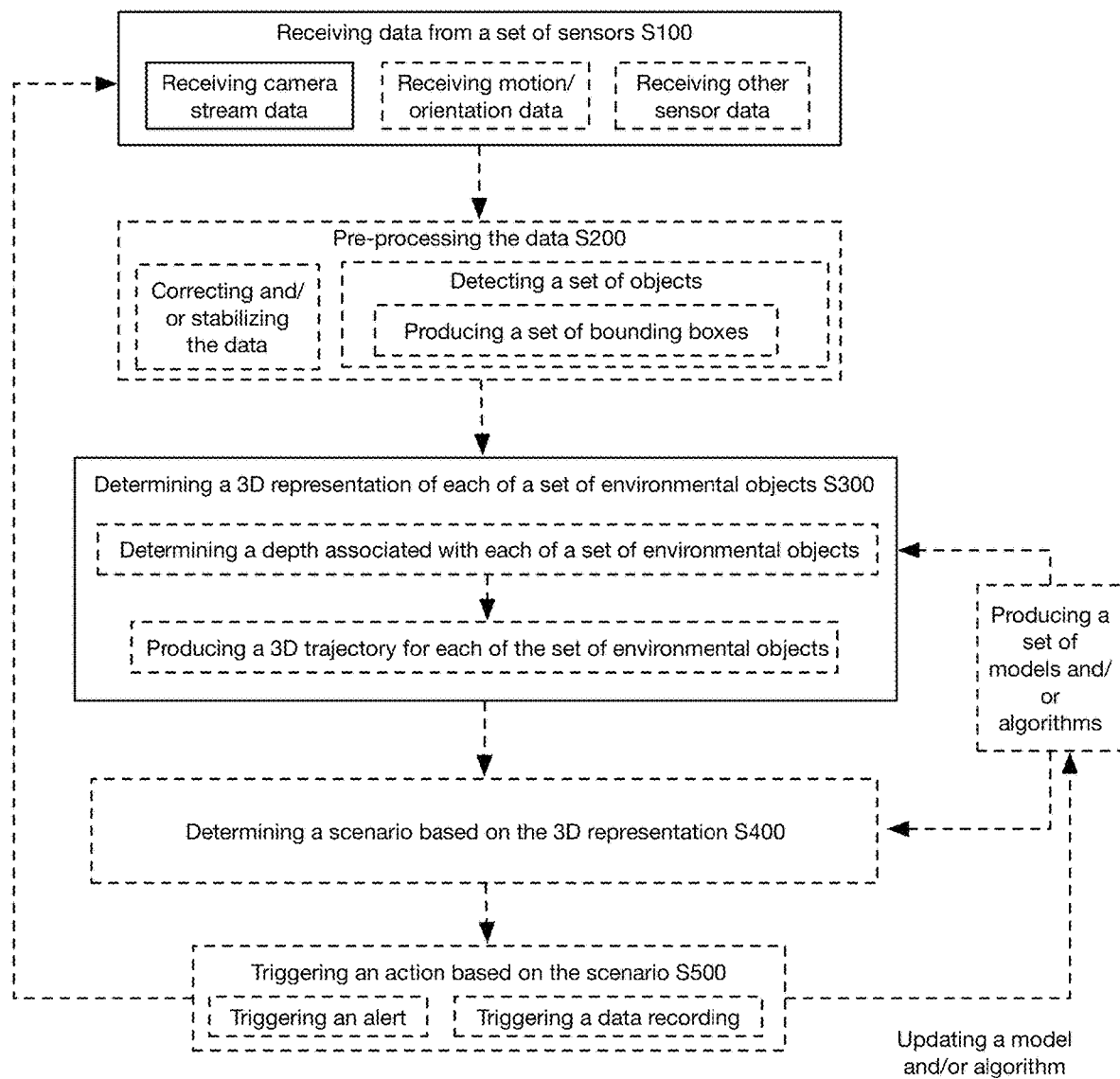
FIG. 2 is a schematic of a method for producing a 3D environmental representation.

As shown in FIG. 2, a method 200 for producing an environmental awareness for alerting an operator of a vehicle includes receiving data from a set of sensors S100 and analyzing a set of objects in the vehicle's environment S300. Additionally or alternatively, the method 200 can include any or all of: pre-processing the data S200; determining a scenario based on the analyzed objects; triggering an action based on the scenario S500; producing a set of models and/or algorithms; and/or any other suitable processes performed in any suitable order. The method 200 can be performed with a system as described above and/or any other suitable system.

2. Technological Improvements

The system and method for producing an environmental awareness for alerting an operator of a vehicle can confer several benefits over current systems and methods.

In a first variation, the technology confers the benefit of producing 3-dimensional understandings of objects in a bike rider's environment, thereby enabling actionable information (e.g., alerts, warnings, etc.) to be provided to the rider, which can increase his awareness, safety, and confidence in traversing densely populated and/or otherwise risky environments. To further elaborate, riding a bicycle or other personal vehicle can pose significant dangers to the rider as he navigates his environment, especially in densely populated areas in which automobiles, other cyclists, and pedestrians, operate in close proximity with the rider and often behave in unexpected and/or sudden ways. Providing a real-time, situational awareness to the rider can have life-saving outcomes in such environments. Conventional systems and methods for providing a comprehensive, 3-dimensional situational awareness, however, such as those implemented in autonomous or semi-autonomous vehicles, have numerous limitations and complexities in implementing, however, and tend to be: expensive, requiring specialized sensing and processing equipment (e.g., equipment specialized for depth estimation), and overall prohibitive for use on bicycles. The system and/or method can confer the benefit providing such a situational awareness without requiring conventional and/or specialized hardware, conventional processing, and/or any combination.

Additionally, the technology can confer the benefit of producing this information using low-cost sensing equipment which is conventionally unable to provide depth estimation information. In specific examples, for instance, the system and/or method are implemented with a set of monocular, fisheye cameras (e.g., sensors without stereo depth), which are inexpensive and easily integrated into numerous types of vehicles (e.g., bikes, scooters, mopeds, etc.). In examples, for instance, the system and method utilize monocular cameras, which do not produce depth information, to still provide—through a particularly designed geometric algorithm and/or model—a 3D understanding of the biker's environment for use in providing actionable alerts. The system and method can additionally be utilized absent of any other sensors configured to provide (e.g., directly provide) depth information, such as LIDAR sensors, RADAR sensors, ultrasonics, and/or any other sensors.

In a second variation, additional or alternative to the first, the technology confers the benefit of reducing and/or minimizing a computational expense associated with performing dynamic (e.g., real-time, near real-time, etc.) depth estimation of objects in a user's environment. In specific examples, for instance, the method is implemented with a particularly calibrated geometric algorithm and in absence of: computationally expensive depth estimation neural networks, the detailed analysis of scene heuristics in the rider's environment (e.g., computationally expensive perspective transforms based on lane lines and/or horizon cues), and/or other computationally expensive processes.

Additionally, a computational expense can be minimized while also using low-cost equipment not configured for depth estimation, thereby conferring the benefit of being both low-cost and computationally efficient.

In a third variation, additional or alternative to those described above, the technology confers the benefit of providing scene-specific, real-time, intuitive, and actionable alerts to the user, thereby enabling him or her to quickly respond to dangers detected in his or her environment. In specific examples, for instance, a directionality associated with a potential danger is conveyed to the user based on a scene-specific analysis such that the user can take optimal action (e.g., swerve, pull over, stop, speed up, etc.).

Additionally, the technology can confer the benefit of enabling the efficient and modular addition of particular scenarios which the system can detect and trigger actions based on.

In a fourth variation, additional or alternative to those described above, the technology confers the benefit of producing trajectories associated with environmental objects to an optimal level of accuracy needed for robust and actionable alerts to be provided to the user, while also minimizing cost and/or computational resources associated with its implementation. In specific examples, for instance, the detection, classification, and/or trajectory determination of environmental objects are performed with a high enough accuracy to actionably and reliably alert the rider to a danger (e.g., general direction of danger, type of object posing a risk to the rider, etc.), but with a lower accuracy than that implemented in numerous conventional systems and methods, such as those which: operate a vehicle (e.g., in autonomous and/or semi-autonomous vehicles), utilize high-cost equipment (e.g., Lidar, Radar, stereo depth cameras, processing subsystems, etc.), have high computational times and/or expenses, and/or are otherwise prohibitive in applications of the present system and/or method.

Additionally or alternatively, the system and method can confer any other benefit.

3. System

As shown in FIG. 1, a system 100 for producing an environmental awareness for alerting an operator of a vehicle includes a sensor subsystem. Additionally or alternatively, the system 100 can include and/or interface with any or all of: a vehicle (e.g., bicycle); computing and/or processing subsystem; user interface; user device; output devices; and/or any other components.

The system 100 functions to collect and process information (e.g., sensor data) in an environment of a biker, which can be used to increase the safety of the biker (and/or any other individuals in her environment) as she navigates her environment. Additionally or alternatively, the system 100 can function to provide actionable alerts to the rider (and/or any other users); minimize a cost (e.g., financial cost, computational cost, etc.) associated with the system and/or method; and/or can perform any other functions.

In a preferred set of variations, the system 100 further functions to determine and/or predict 3D trajectories of objects in the biker's environment such that particular risks to the rider can be dynamically predicted and conveyed to the user. In specific examples, this is further enabled through equipment which is not configured (e.g., conventionally configured) for depth estimation, such as monocular cameras.

3.1 System—Components

The system 100 is preferably configured to include and/or interface with at least a bicycle (equivalently referred to herein as a bike) and/or any other 2-wheeled vehicle, such that the system can collect and process data associated with the bicycle's traversal through its environment. The bike can be motorized (e.g., electric bike, moped, motorcycle, scooter, etc.), non-motorized (e.g., manual bike, scooter, etc.), or otherwise operable.

Additionally or alternatively, the system 100 can be configured to interface with any other vehicle, such as a vehicle having greater than 2 wheels (e.g., car, tricycle, 3-wheeled scooter, skateboard, etc.); a vehicle having less than 2 wheels (e.g., unicycle); other forms of transportation (e.g., rollerblades, stroller, watercraft, etc.); and/or any other vehicles or objects.

Further additionally or alternatively, the system 100 can be implemented in absence of a vehicle (e.g., coupled to a user as a pedestrian) and/or otherwise suitably implemented.

For the purpose of simplification, the vehicle that the system interfaces with will be referred to herein as a bike and/or ego.

The system includes a sensor subsystem (equivalently referred to herein as a set of sensors), which functions to collect information associated with the environment of the bike and optionally with the bike itself (e.g., bike motion, bike orientation, etc.), which is preferably processed in the method 200 (e.g., to determine a set of alerts, to trigger an action, etc.). Additionally or alternatively, the sensor data can be used in any other suitable ways.

The sensor subsystem preferably includes an optical subsystem, which functions to collect image data (e.g., video streams) associated with the bike's environment. The optical subsystem preferably includes a set of cameras, but can additionally or alternatively include any other optical sensors (e.g., Lidar).

In preferred variations (e.g., as shown in FIG. 1), the optical subsystem includes a set of multiple cameras, which includes at least a front camera (e.g., which images the direction in which the bike is heading) and a rear camera (e.g., which images the direction trailing the bike). Additionally or alternatively, the cameras can image one or more sides of the bike, a region superior to the bike (e.g., upward-facing direction), a region inferior to the bike (e.g., downward-facing direction), and/or any other directions. Alternatively, the set of cameras can include a single camera and/or any other types of imaging devices.

In preferred examples, the system is implemented absent of Lidar and Radar sensors.

In alternative examples, the system can include and/or interface with Lidar and/or Radar sensors.

The set of cameras preferably includes one or more single lens cameras (e.g., monocular cameras), which function to capture image data in the vehicle's environment. In examples, a conventional limitation associated with single lens cameras can be a lack of depth information that can be determined (e.g., directly determined) from a single lens camera. However, in some variants, the system and/or method can confer the benefit of properly identifying and/or reacting to object depths without cameras having additional lenses, while conferring the benefits of single lens cameras, which can include, but are not limited to: lower cost, lower associated computational requirements associated with the collected data, smaller weight and/or physical profile, and/or any other benefits.

Additionally or alternatively, the set of cameras can include cameras having multiple lenses (e.g., stereocameras), sensors configured to collect depth information (e.g., LIDAR, RADAR, etc.), and/or any other sensors or combination of sensors.

In a preferred set of variants, each of the set of cameras is a monocular, fisheye (e.g., circular fisheye, full-frame fisheye, etc.) camera, which is configured to image the bike's environment with a wide field of view (e.g., 200 degrees, between 100 and 300 degrees, between 150 and 250 degrees, etc.), thereby enabling a minimal number of cameras to be used while being able to detect and understand the behavior of all relevant objects in the bike's environment. Additionally or alternatively, the cameras can include any other cameras and/or combination of cameras.

In preferred variations, for instance, the system minimizes a number and/or complexity of cameras used to perform imaging of the bike's environment, such as through the use of a front monocular camera and a rear monocular camera, where the video streams from each are processed individually and absence of hardware configured for depth estimation. Additionally or alternatively, the cameras can include any other cameras and/or combination of cameras, and/or can produce data which is processed in any suitable way(s).

Figure 3:
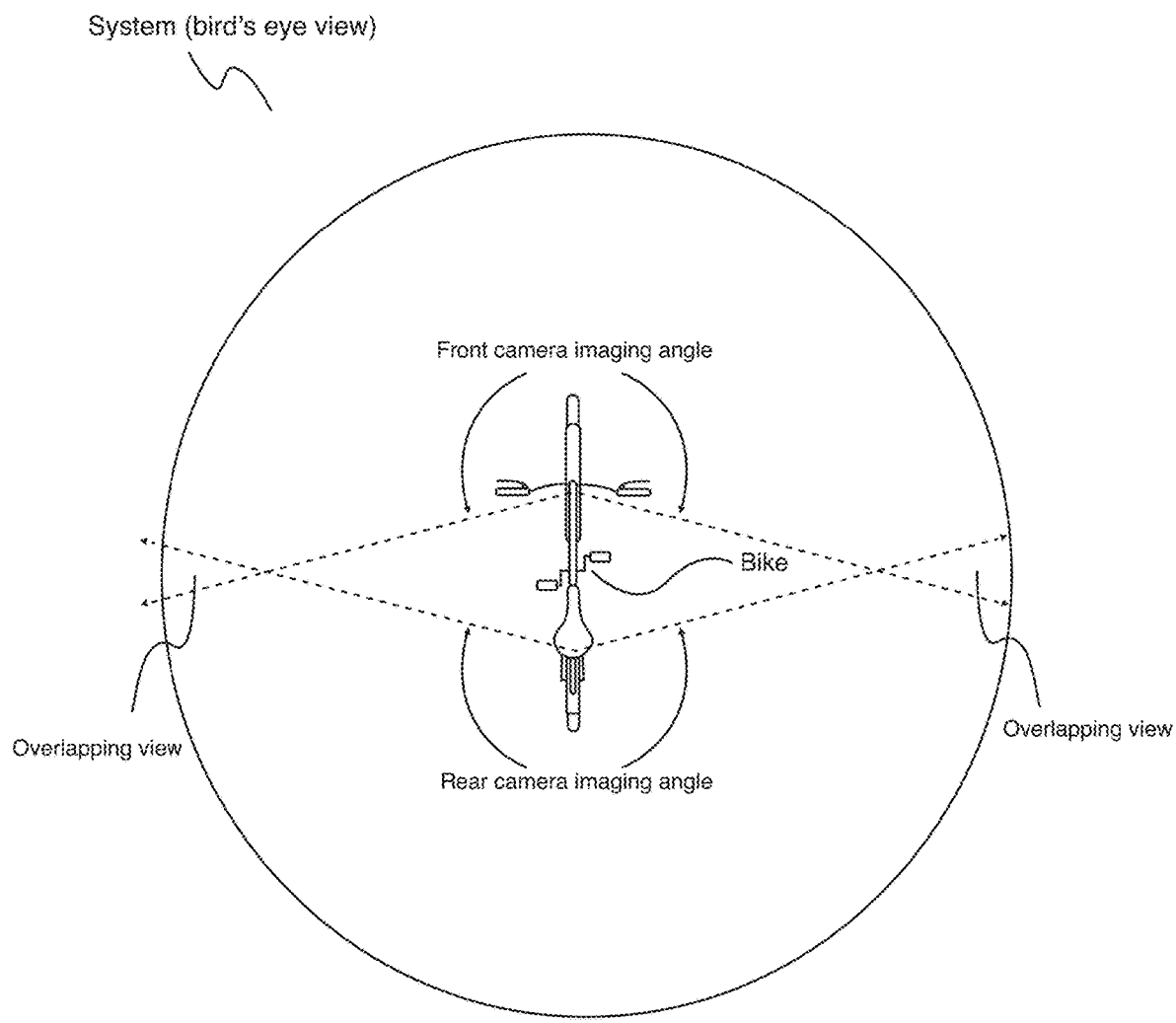
FIG. 3 is a schematic of a variation of a set of cameras in a system for producing a 3D environmental representation.

In a preferred set of variations (e.g., as shown in FIG. 3), the sensor subsystem includes a set of monocular fisheye cameras which have overlapping (e.g., partially overlapping) fields of view. Alternatively, the set of cameras can non-overlapping fields of view.

The sensor subsystem further preferably includes a set of motion and/or orientation sensors, which can individually and/or collectively function to correct, adjust, supplement, and/or otherwise alter or inform any or all of the data collected at the optical subsystem (e.g., images) and/or information determined based on this or other data (e.g., downstream outputs of the method, intermediate outputs of the method, final outputs of the method, etc.). Additionally or alternatively, the set of motion and/or orientation sensors can be used in relation to non-optical data, and/or can be otherwise suitably used.

The set of motion and/or orientation sensors can include any or all of: accelerometers, gyroscopes, magnetometers, inertial measurement units (IMUs) (e.g., including accelerometer(s), gyroscope(s), and magnetometer(s)), speedometers, altimeters, and/or any other sensors. In a first set of variations, the sensor subsystem includes a set of one or more IMUs. In specific examples, the sensor subsystem includes an IMU coupled to and/or arranged proximal to each of the set of optical sensors (e.g., cameras), which can be used to correct for a roll of the bicycle (e.g., as the bicycle is turning), stabilize the image data from the cameras, accurately assess the trajectories of other objects in the ego's environment when the ego is turning, and/or perform any other functions.

In a first set of variants, for instance, the motion and/or orientation sensors can function to enable the optical subsystem to be implemented on a bicycle (e.g., which is subject to numerous types of motion such as roll, vertical perturbations, etc.) or other analogous vehicle, and/or perform any other functions, by enabling roll to be corrected for in the images collected at the optical sensors (e.g., by rotating the images according to a roll angle detected at the motion and/or orientation sensors).

In a second set of variants, data from the motion and/or orientation sensors can be used to produce accurate predicted trajectories and/or motion information for objects in the ego's environment during all of the ego trip. For instance, motion and/or orientation data can be used to determine when and/or to what degree and/or how fast the ego is turning, which can be used to correct the perceived trajectory and/or motion for other objects relative to the ego. For instance, based on image data alone, when the ego is turning, it may appear that objects in its environment are changing heading and/or moving in a different way, when it is actually the ego turning that is causing the effect.

Additionally or alternatively, motion and/or orientation data can be otherwise suitably used.

The sensor subsystem can additionally or alternatively include any other sensors, such as, but not limited to: other cameras (e.g., visual range, multispectral, hyperspectral, IR, stereoscopic, etc.) or optical sensors (e.g., photodiodes), acoustic sensors (e.g., microphones), temperature sensors, pressure sensors, flow sensors, vibration sensors, proximity sensors, chemical sensors, electromagnetic sensors, force sensors, or any other suitable type and/or combination of sensors.

The system can optionally include and/or interface with a set of computing and/or processing subsystems, which function to process any or all of the data received at the sensor subsystem. The computing and/or processing subsystem can optionally be at least partially arranged onboard a user device (e.g., mobile user device). Additionally or alternatively, any or all of the computing and/or processing subsystem can arranged outside of a user device (e.g., onboard the bike at a video processor in communication with one or more cameras), at a remote location (e.g., cloud computing subsystem), and/or at any combination of devices.

The system can optionally include and/or interface with a user device, which can function to: host an application (e.g., client application); perform any or of all of the computing and/or processing required in the method 200; provide information (e.g., alerts, directions, notifications, etc.) to the user (e.g., via speakers, via a display, via a tactile subsystem); receive information from the user; and/or can perform any other functions. The user device is preferably a mobile user device, which can be any or all of: uncoupled relative to the bike, reversibly coupled to the bike, permanently coupled to the bike, reversibly coupled to the user, any combination, and/or otherwise configured.

The user device is preferably a mobile phone (e.g., smartphone), but can additionally or alternatively include any or all of: a tablet, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component(s).

In a preferred set of variations, the system is configured to interface with a user device (e.g., smartphone) hosting a client application, where the user device includes one or more processors configured to perform any or all of the processing in the method 200, and the client application is configured to provide alerts to the user as produced in the method 200.

Additionally or alternatively, any or all of the processing can be performed at a separate device, multiple devices, a remote computing subsystem, and/or at any combination of locations.

The system can optionally include one or more applications (e.g., client applications) executable on the user device, which can function to perform any or all of: processing information (e.g., in the method 200); providing a user interface; receiving inputs from the user; providing outputs to the user (e.g., alerts, information about surrounding objects, alarm sounds at a speaker, etc.); and/or performing any other functions.

The application preferably runs on a user device (e.g., as described above), but can alternatively run on any other suitable computing system. The client can be a native application, a browser application, an operating system application, or any other suitable application.

The system 100 can additionally or alternatively include any other components, such as, but not limited to: one or more power sources (e.g., onboard the user device, onboard an electric bike or other powered vehicle, etc.); output devices (e.g., speakers coupled to and/or arranged proximal to the cameras to provide alerts to the user, a display coupleable with and/or integrated within the vehicle, etc.); and/or any other components.

In a first variation, the system 100 is configured to interface with a bike, the system including and/or interfacing with any or all of: a set of two (or more) fisheye cameras (e.g., monocular fisheye cameras); a set of output devices (e.g., speakers coupled to the cameras); a user interface (e.g., provided at a client application executing on a user device); a processing subsystem (e.g., at a user device, a video processor with artificial intelligence [AI] modules/programs coupled to and/or in communication with one or more cameras, etc.); and a power source (e.g., integrated in the bike, coupled to the bike, etc.). Additionally or alternatively, the system 100 can include and/or interface with any other components.

In a first set of specific examples, the system 100 is configured to interface with an electric bike, where a power source integrated into the electric bike is used in powering any or all components of the system.

In a second set of specific examples, the system 100 is configured to interface with a manual (e.g., non-powered) bike, where the system can include one or supplementary power sources (e.g., coupled to/reversibly coupled to the bike, onboard the user device, etc.).

Figure 6:
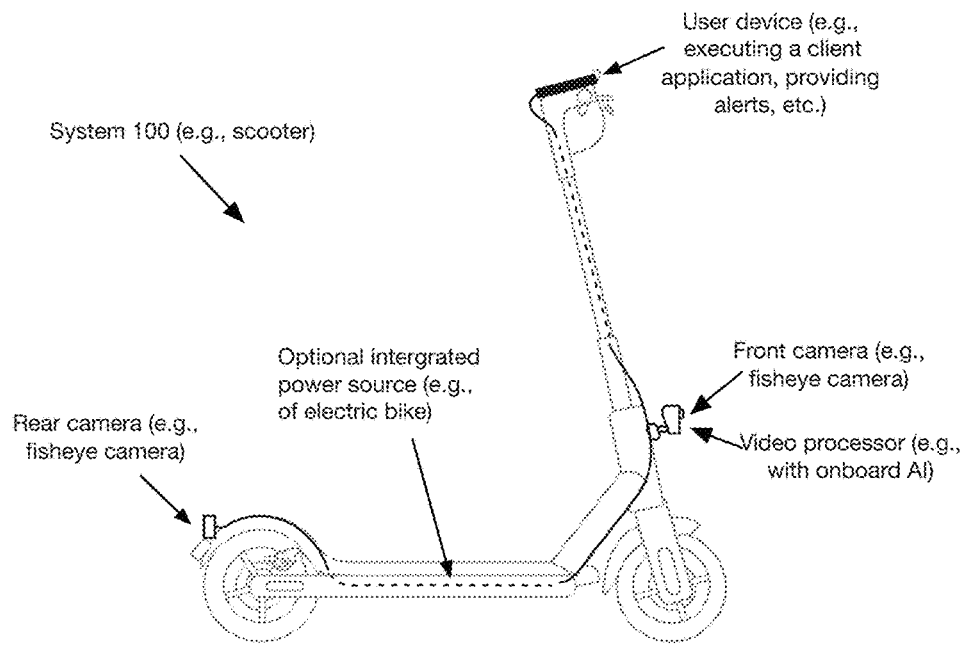
FIG. 6 depicts a variation of a system for producing a 3D environmental representation.
Figure 7:
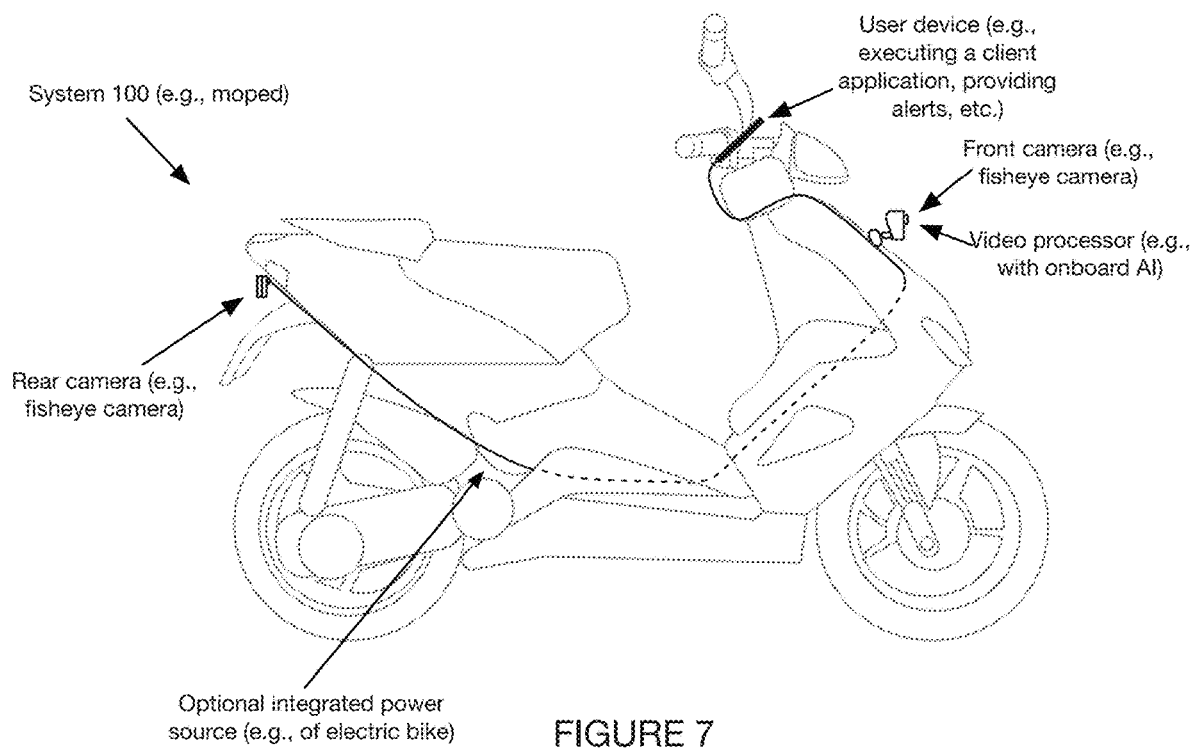
FIG. 7 depicts a variation of a system for producing a 3D environmental representation.

In a second variation, the system 100 is configured to interface with any other vehicle (e.g., as shown in FIG. 6, as shown in FIG. 7, etc.).

4. Method

As shown in FIG. 2, a method 200 for producing an environmental awareness for alerting an operator of a vehicle includes receiving data from a set of sensors S100 and analyzing a set of objects in the vehicle's environment S300. Additionally or alternatively, the method 200 can include any or all of: pre-processing the data S200; determining a scenario based on the analyzed objects; triggering an action based on the scenario S500; producing a set of models and/or algorithms; and/or any other suitable processes performed in any suitable order. The method 200 can be performed with a system as described above and/or any other suitable system.

The method 200 preferably functions to predict, assess, and respond to potentially dangerous scenarios in an environment of a user (e.g., riding a bike). In preferred variations, the method 200 enables this through depth estimation and trajectory prediction processes for objects in an environment of the user, which can then be used to determine if a particular scenario (e.g., side collision, rear collision, front collision, etc.) might apply to the user and trigger an action accordingly. In specific examples, the method is enabled with low-cost equipment (e.g., monocular cameras) and minimal computational resources.

Additionally or alternatively, the method 200 can perform any other functions and/or be otherwise suitably configured.

4.1 Method—Receiving Data from a Set of Sensors S100

The method 200 can include receiving data from a set of sensors S100, which functions to receive information with which to perform any or all of the remaining processes of the method 200. Additionally or alternatively, S100 can function to receive information from low-cost and/or retrofittable equipment, where remaining processes of the method 200 are configured to produce accurate and actionable analytics with such data. Further additionally or alternatively, S100 can perform any other functions.

S100 is preferably performed at least initially during the method 200 and optionally multiple times (e.g., at a predetermined frequency, continuously, at random intervals, etc.) during the method 200 and/or during operation of the vehicle, such as at a set of multiple intervals (e.g., continuously, at a predetermined frequency, at a random set of intervals, in response to a trigger, etc.) during a trip of the vehicle. In examples, for instance, S100 and/or any subsequent processes of the method are performed throughout a duration of a vehicle trip (e.g., as detected by the system speed being above a threshold, as detected by the system breaching a geofence, etc.), such as, but not limited to: at least once per second, at least once every 0.9 seconds, at least once every 0.8 seconds, at least once every 0.7 seconds, at least once every 0.6 seconds, at least once every 0.5 seconds, at least once every 0.4 seconds, at least once every 0.3 seconds, at least once every 0.2 seconds, at least once every 0.1 seconds, and/or at any other set of intervals. Additionally or alternatively, S100 can be performed in response to another process of the method 200, in response to a trigger, and/or at any other times.

S100 is preferably performed with a set of sensors (e.g., as described above), and further preferably with at least a set of cameras onboard the vehicle. In preferred variations, for instance, images (e.g., frames of a video stream) are collected in S100 from a set of multiple cameras onboard the vehicle (e.g., 1 image per camera at each iteration of S100), such as (e.g., as shown in FIG. 3) a front monocular camera (e.g., front monocular fisheye camera) and a rear monocular camera (e.g., front monocular fisheye camera). Additionally or alternatively, S100 can include collecting data from any other type and/or number of cameras.

S100 further preferably includes collecting motion and/or orientation data from each of a set of motion and/or orientation sensors (e.g., IMUs), which can be used for adjusting images; adjusting image data and/or downstream outputs (e.g., bounding boxes) produced in the method 200; informing which action(s) get triggered in S500; and/or the data can be used in any other suitable way(s).

Additionally or alternatively, S100 can include collecting data from any other suitable sensors, such as, but not limited to: microphones, location sensors, and/or any other sensors.

The set of sensors are preferably coupled to the vehicle, but can additionally or alternatively be arranged onboard a user device, in an environment of the vehicle, coupled to the user, and/or otherwise arranged.

S100 can optionally include transmitting any or all of the sensor data to one or more computing and/or processing subsystems of the system (e.g., onboard the user device, offboard the vehicle, etc.). Additionally or alternatively, any or all of the data can be processed at a processing subsystem integrated with and/or coupled to any or all of the sensors (e.g., video processor coupled to one or more cameras).

S100 can additionally or alternatively include any other suitable processes.

4.2 Method—Pre-Processing the Data S200

The method 200 can optionally include pre-processing any or all of the data S200, which functions to prepare the data for further processing in the method 200.

S200 is preferably performed in response to S100 but can additionally or alternatively be performed at any other time(s). In some variants, for instance, one or more sub-processes of S200 is performed in response to S100, and another sub-process is performed in response to producing a set of bounding boxes. Additionally or alternatively, any or all of S200 can be performed at other times, the method 200 can be performed in absence of S200, and/or the method 200 can be otherwise suitably performed.

S200 can optionally include correcting and/or stabilizing any or all of the data, such as to account for motion of the sensors (e.g., cameras) resulting from movement of the vehicle to which they are coupled. In some variations, for instance, S200 includes correcting for a roll of the ego, which refers to a rotation about a front-to-back axis of the vehicle, which functions to account for the amount (e.g., angle) of tilt that the bike experiences during its operation. This can be especially pronounced, for instance, as the user is turning and/or performing any other actions. The roll of the bike (e.g., as indicated by a roll angle, as indicated by an angular acceleration, as indicated by an angular velocity, etc.) is preferably determined based on one or more orientation sensors (e.g., IMU, gyroscope, etc.) coupled to the bike (e.g., and processed at the user device), but can additionally or alternatively be performed with any other data. In some examples, for instance, each camera is housed together with an IMU where the data from the multiple IMUs can be aggregated (e.g., averaged), independently used (e.g., compared and the maximum value used, a value from the IMU closest to the relevant camera used, etc.), and/or otherwise suitably used. Alternatively, a single IMU can be coupled to the ego, other types of motion and/or orientation sensors can be used, and/or any other sensors can be used.

S200 can optionally additionally or alternatively include de-warping the video streams collected at the set of cameras, which functions to remove the effects of a fisheye (or other wide angle) lens of each camera. The de-warping process is preferably performed with a predetermined algorithm and/or mapping, but can additionally or alternatively be performed with a trained model, dynamic process, and/or any other number of processes. Additionally or alternatively, a de-warping process can be performed on any number of intermediate outputs (e.g., rather than images/frames of a video stream), such as a set of detected objects in the video stream.

S200 can optionally additionally or alternatively include a stabilization process, which functions to stabilize any or all of the image information and/or derived information relative to the motions (e.g., bumping, bouncing, tilting, etc.) of the ego. The stabilization process is preferably performed with sensor data, and further preferably accelerometer and gyroscope data (e.g., IMU data, fused data, etc.) collected at the bike, but can additionally or alternatively be performed with any number of algorithms, models, and/or tools. This can be performed on the video stream data, intermediate outputs (e.g., bounding boxes), and/or any other data.

S200 preferably includes detecting a set of objects in the video stream data, where the detected objects are further processed in the method 200. Detecting the set of objects preferably includes producing a bounding box representation (e.g., 2D bounding box) for each object, and further preferably includes assigning a classification to each of the set of bounding boxes. Additionally or alternatively, S200 can include determining other information associated with objects, such as, but not limited to: state information (e.g., position, velocity, acceleration, etc.), state information relative to the ego (e.g., distance between ego and object, relative velocity between ego and object, relative acceleration between ego and object, etc.), and/or other information.

In preferred variants, S200 and/or a remainder of the method 200 is performed absent of analyzing scene heuristics associated with the current image being processed, such as, but not limited to: identifying road edges or other infrastructural boundaries, identifying a vanishing point and/or horizon line in an image, and/or otherwise understanding the scene. In preferred examples, for instance, objects are identified through the analysis of a set of regions within the image (e.g., predetermined regions, dynamically determined regions, etc.), where the set of regions are prescribed without analyzing the current image.

The detection process preferably includes processing the video stream data with a computer vision algorithm or model, but can additionally or alternatively include any other processes, be performed absent of these processes, and/or be otherwise suitably performed. The computer vision algorithm and/or model can be trained (e.g., with machine learning, neural network, etc.), untrained (e.g., rule-based, statistical, etc.), or involve both trained and untrained components. The detected set of objects are preferably represented as a set of bounding boxes, but can additionally or alternatively be represented as other data types (e.g., 3D meshes, 2D representations, etc.) and/or include other information (e.g., classification of object type, estimated motion parameters, etc.).

S200 can optionally further include classifying any or all of the set of detected objects, such as to determine an object type (e.g., car vs. bike vs. pedestrian, car vs. not a car, etc.). The classification is preferably performed with a computer vision algorithm and/or model, but can additionally or alternatively be otherwise performed and/or performed based on any suitable data (e.g., a size of the associated bounding box, a height of the associated bounding box, historical information associated with the bounding box, etc.). In some variants, for instance, the classification can represent, but is not limited to, one or more of the following categories: car, truck, Sports Utility Vehicle (SUV), train, 2-wheeled vehicle (e.g., bicycle, moped, motorcycle, etc.), pedestrian, and/or any other suitable category.

S200 can optionally include a visual odometry process, which functions to provide an understanding of the ego vehicle's translation and/or other motion features (e.g., acceleration, deceleration, turning of the ego vehicle, etc.), which can be useful in providing forward collision warnings to the rider. In specific examples, for instance, the information from the visual odometry process can be used to inform how early to issue a warning to give the rider enough time to brake, based on the rider's deceleration potential (e.g., based on current speed) combined with whether the object is a stationary object (parked car) or a moving object (moving car).

Alternatively, the method 200 can be performed absent of a visual odometry process and still produce high accuracy and actionable insights, which can confer further benefits of computational efficiency.

In a first variant, a visual odometry process is performed in S200, where the outputs of the visual odometry process serve as inputs to one or more algorithms (e.g., in S300, in S400, etc.) used in the method 200, specifically for use in producing forward collision warnings. Additionally or alternatively, the visual odometry information can be used in other use cases.

Figure 9:
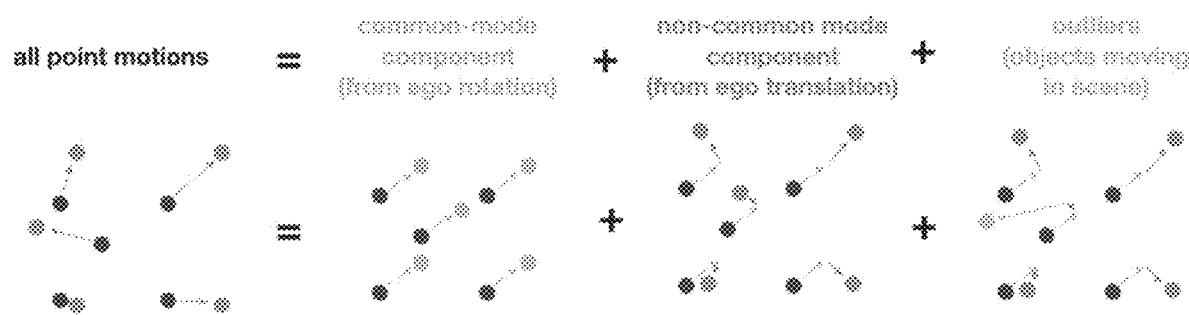
FIG. 9 depicts an example of a set of points analyzed in a visual odometry process for providing forward collision warnings.

In variants including a visual odometry process, the visual odometry process preferably involves a fusion of techniques where a first technique includes, but is not limited to, any or all of: identifying a set of key points; processing the set of key points and/or other data with an optical flow estimation process (e.g., a differential flow estimation process, a Lucas-Kanade method and/or modified Lucas-Kanade method, etc.) to track motions of the key points between frames; separating out points corresponding to the ego vehicle rotation (equivalently referred to herein as common mode point motions) from points corresponding to the ego vehicle translation (equivalently referred to herein as non-common mode point motions); applying a statistical process to separate out outlier points (e.g., objects moving in the scene) from ego vehicle translation; and aggregating the remaining points into an estimate of the ego vehicle's true translation. Examples of common-mode, non-common mode, and outlier point motions are depicted in FIG. 9. To expand on these: "common-mode" refers to the portion of points that is shared across all points; "non-common mode" refers to the portion that is not shared across all points; and "outliers" refers to motions that are statistically different than other motions in that point's immediate proximity. A second technique can include, but is not limited to, any or all of: identifying objects near the edge of the frame that appear in both frames; calculating the position of the objects in global space (e.g., triangulated based on camera physical separation); calculating how far the objects have moved between video frames; calculating object velocities; using statistical process(es) to separate out outlier points (objects moving in the scene) from ego translation; and aggregating the remaining points into an estimate of true ego translation. The results of the $1^{st}$ and $2^{nd}$ techniques are preferably then combined (e.g., aggregated) to get a more robust understanding of the ego vehicle's velocity.

One potential advantage of such a visual odometry process is that it can be self-contained within a hardware/software stack of the system, thereby removing a layer of integration and sensor fusion with vehicle models that have varying sensor characteristics (e.g., communication protocols, sensor latency, sensor accuracy, etc.). The process can further allow speed information to be obtained on vehicle models that have no communications or speed sensor data available. Additionally or alternatively, the process can have any other suitable advantages.

Additionally or alternatively, S200 can include any other suitable processes.

4.3 Method—Analyzing a Set of Objects in the Vehicle's Environment S300

The method 200 can include analyzing a set of objects in the vehicle's environment S300, which functions to accurately and robustly assess the environment (e.g., 3D nature of the environment based on 2D images) of the user such that potential interactions between the environmental objects and the bike can be predicted.

S300 is preferably performed in response to S200, but can additionally or alternatively be performed in absence of S200, in response to S100, and/or at any other times during the method 200.

S300 is preferably performed with a set of models and/or algorithms, which can be any or all of: trained (e.g., machine learning, deep learning, etc.), untrained (e.g., programmed, rule-based, etc.) and/or any combination of trained and untrained. In some variations, part or all of S300 is performed in absence of a neural network (e.g., to minimize computational resources/time). Alternatively, any or all of S300 can be performed with one or more neural networks.

S300 is further preferably performed in accordance with any or all of the hardware components described above and can thereby be configured to work with and/or address any or all associated limitations with said hardware components. In some variants, for instance, S300 is specifically configured to receive and process data from single lens cameras not having inherent depth measurement capabilities, while enabling the method 200 to react to the 3D environment of the vehicle. Additionally or alternatively, S300 can be configured to interface with any suitable hardware.

S300 preferably includes determining a depth (e.g., distance relative to the camera and/or bike) associated with each of a set of environmental objects, such as each of the set of detected objects determined in S200. Additionally or alternatively, a depth can be determined for only a subset of objects (e.g., only cars) and/or for any other objects. The depth can be a relative depth (e.g., between the object and the ego, between the object and a landmark of the scene, between 2 objects, etc.), a position having depth information (e.g., [x,y,z] position information, location information, distance information, etc.), and/or any other information.

The depth is preferably determined for a bounding box associated with each object, and further preferably determined based on: a height of the bounding box and a classification for the bounding box. Additionally or alternatively, the depth can be determined based on a subset of this information, additional information (e.g., historical information such as bounding box information from previous frames, a location of the bounding box within the image, etc.), and/or any other information.

In a preferred set of variations, a depth of each object is determined with a highly-tuned, calibrated geometric estimation algorithm (equivalently referred to herein as a depth estimation algorithm), which functions to infer the depth of the objects in the ego's environment. The algorithm preferably determines a depth based on a height associated with the detected object (e.g., bounding box height produced in S200), and the bounding box's classification (e.g., car vs. motorcycle vs. pedestrian, vs. train, etc., along with parameters associated with the camera collecting the image data (e.g., lens-intrinsic parameters) and optionally a location of the bounding box within the image. This algorithm can have the advantage of being computationally inexpensive, especially when compared with conventional systems and/or methods, such as those which involve any or all of: neural networks for monocular depth estimation which are computationally expensive; the analysis of scene heuristics in the image data (e.g., detecting road lines and/or horizon cues to perform a perspective transform, other than detecting a vanishing point, etc.), which can be computationally expensive and/or inconsistent in accuracy; expensive hardware (e.g., hardware configured for depth estimation, hardware with advanced computing and/or processing, etc.); and/or other features.

The lens-intrinsic parameters can include, but are not limited to, any or all of: focal length, field-of-view, resolution, aperture, or any other parameter. Additionally or alternatively, the lens-intrinsic parameters can include parameters relating to how the image is warped at each location of the image, such as warping caused by using a fisheye lens. Additionally or alternatively, the lens-intrinsic parameters can include any other information.

The lens-intrinsic parameters can be specific to a particular individual camera (e.g., to account for one-off defects, to account for manufacturing differences, etc.); specific to a type of camera (e.g., the type and/or model of monocular camera used in the system); and/or otherwise configured.

In preferred variants, for instance, the depth estimation algorithm is produced through a detailed calibration process of the cameras, such that each location within an image (e.g., raw image, pre-processed image, etc.) can be converted to (e.g., mapped to, calculated, etc.) a depth value based on information collected during the method 200 (e.g., as described above), such as, but not limited to: a bounding box height, a bounding box classification, the bounding box's location within the image, and/or or any other information. In specific examples, the depth estimation algorithm prescribes an algorithm, the algorithm representing an inverse linear relationship between a bounding box height for a particular classification and a depth of the associated object.

The depth estimation algorithm is preferably highly tuned, and/or further preferably not trained according to a machine learning process. Additionally, the depth estimation algorithm is preferably implemented without analyzing the scene of the current image (e.g., determining scene heuristics, analyzing lane lines, detecting image features, performing vanishing point estimation, etc.) and/or previous images. Additionally or alternatively, the depth estimation algorithm can be otherwise constructed. As described above, this can confer computational savings as well as enable use with simpler hardware as compared with conventional systems and/or methods. For instance, a conventional method might involve a complex scene analysis in order to understand depth, such as involving: identifying a vanishing point within the image (e.g., where the edges of the road appear to converge in the distance), identifying a horizon, understanding where an object is within the context of the scene, detecting landmarks of known size and comparing with the object's location to determine an object size, and/or any other computationally expensive processes.

Additionally or alternatively, any other suitable algorithms and/or models can be used.

S300 can optionally further include producing any or all of the set of models and/or algorithms used in determining these depths. In preferred variations, for instance, the algorithm is produced with a custom set of labelling practices (e.g., manual labelling, automatic labelling, partially automatic labelling, etc.) as well as custom data (e.g., data collected with the same type of cameras and/or types of camera lenses, data collected with the same operational parameters as those utilized by the cameras during the method 200, data collected on the same type of vehicle(s), etc.). Additionally or alternatively, any or all of the set of models and/or algorithms can be trained, determined with other suitable data, and/or otherwise suitably determined or configured.

In specific examples, the algorithm and/or model is calibrated based on any or all of: lens distortion parameters associated with the set of cameras (e.g., monocular with a particular field of view); a particular class and/or classes of objects to be processed (e.g., cars); and/or any other calibration processes.

S300 further preferably includes producing (e.g., predicting) a trajectory for each of the set of environmental objects based on the determined depths (e.g., at the current time point, at prior/historical time points, etc.), which functions to assess whether the bike is in danger of encountering potentially risky scenarios (e.g., collision). The trajectory is preferably a trajectory in 3D (equivalently referred to herein as a 3D trajectory), or at least a trajectory that prescribes depths of the object relative to the ego. Additionally or alternatively, trajectories can be determined based on other information, 2D trajectories can be determined, and/or S300 can include any other suitable processes.

Figure 4:
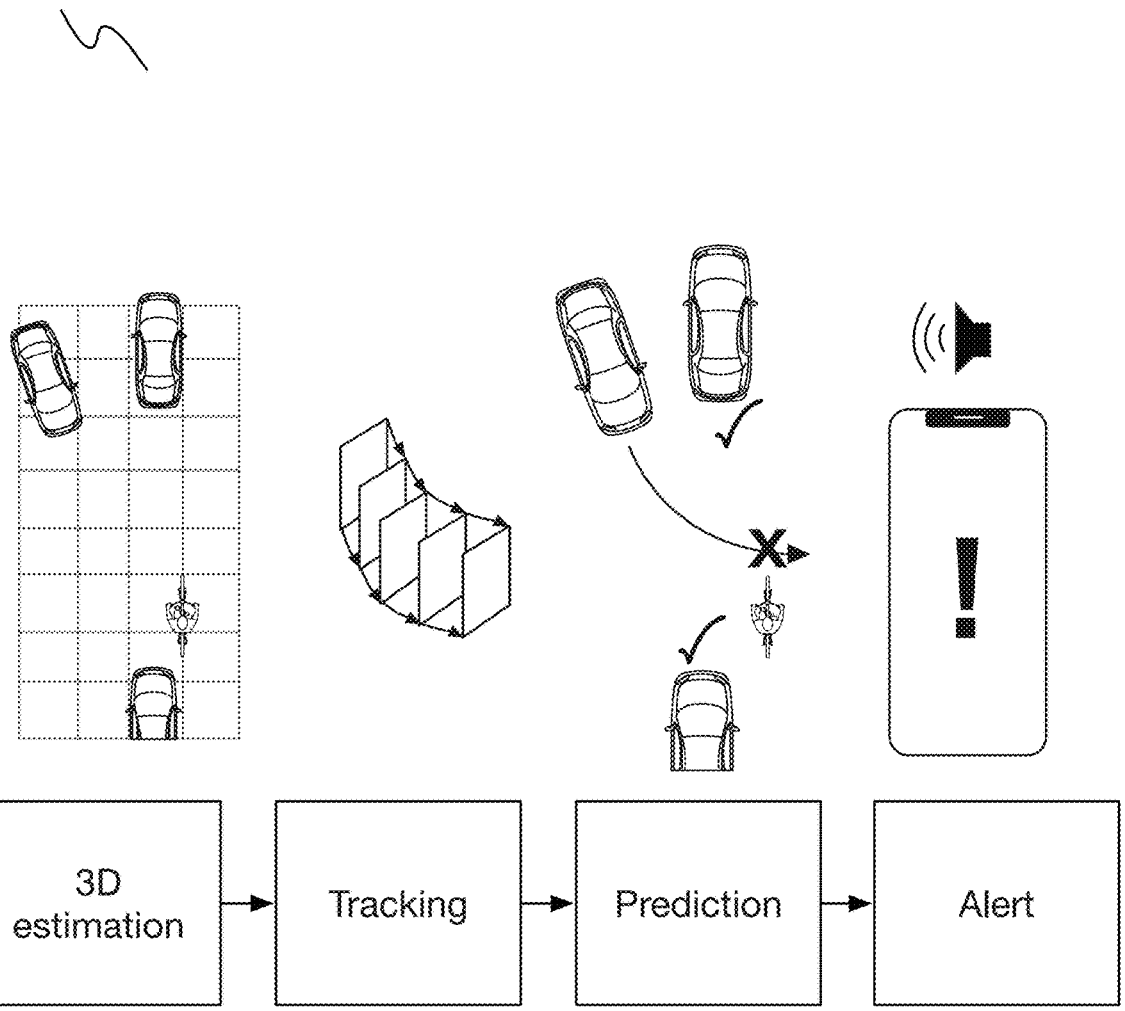
FIG. 4 is a schematic variation of at least a portion of a method for producing a 3D environmental representation.

The trajectories preferably reflect a current location of the object along with a predicted future path (e.g., as shown in FIG. 4), but can additionally or alternatively reflect a prior path, and/or any other locations, predicted or measured. The trajectories can further include other state information associated with one or more locations (e.g., current location, future predicted location, each of a set of locations, aggregated over many locations, etc.) of the trajectory such as, but not limited to: motion information (e.g., speed, linear acceleration, angular acceleration, etc.), orientation information (e.g., heading), and/or any other information.

In preferred variations (e.g., as shown in FIG. 4), for instance, S300 includes estimating a 3D location (e.g., location including depth) of each of the set of environmental objects, tracking this 3D location (e.g., over historical data), and predicting the trajectory of the environmental objects based on this tracked location. These sub-processes can be performed with any suitable models, algorithms, equations (e.g., dynamics equations, kinematic equations, etc.), or tools.

In a set of examples, a trajectory for each of the set of objects is produced, including any or all of: retrieving a set of previous locations of the object (e.g., from iterations of the method 200 performed at previous frames); predicting a future location and/or future locations based on a kinematic algorithm (e.g., set of kinematic equations, set of dynamic equations, set of physics-based equations, etc.); predicting current and/or future motion and/or orientation parameters of the object (e.g., linear speed, angular speed, linear acceleration, angular acceleration, turning angle, turning radius, etc.) based on current and/or previous object information (e.g., decreasing frame-to-frame depth differences indicating object is speeding up, increasing frame-to-frame depth differences indicating object is slowing down, lateral movement of object between frames indicating object is changing lanes and/or turning, etc.) and/or a kinematic algorithm; predicting an intent and/or behavior of the object; and/or any other information.

In an alternative set of examples, a trained model (e.g., neural network, machine learning model, etc.) can be used additional or alternative to a kinematic algorithm.

Figure 11A:
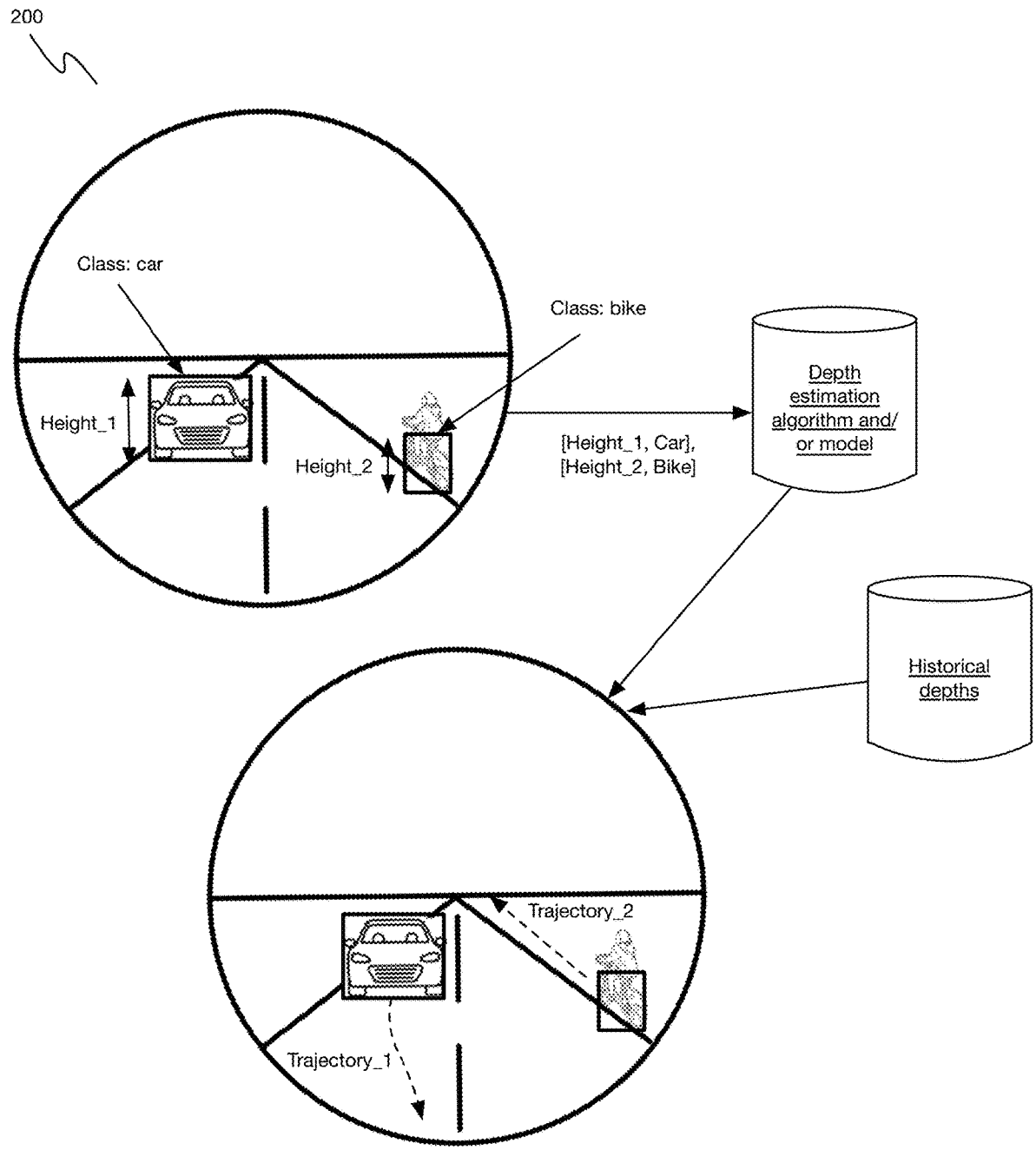
FIGS. 11A-11B depict a variant of the method 200.
Figure 11B:
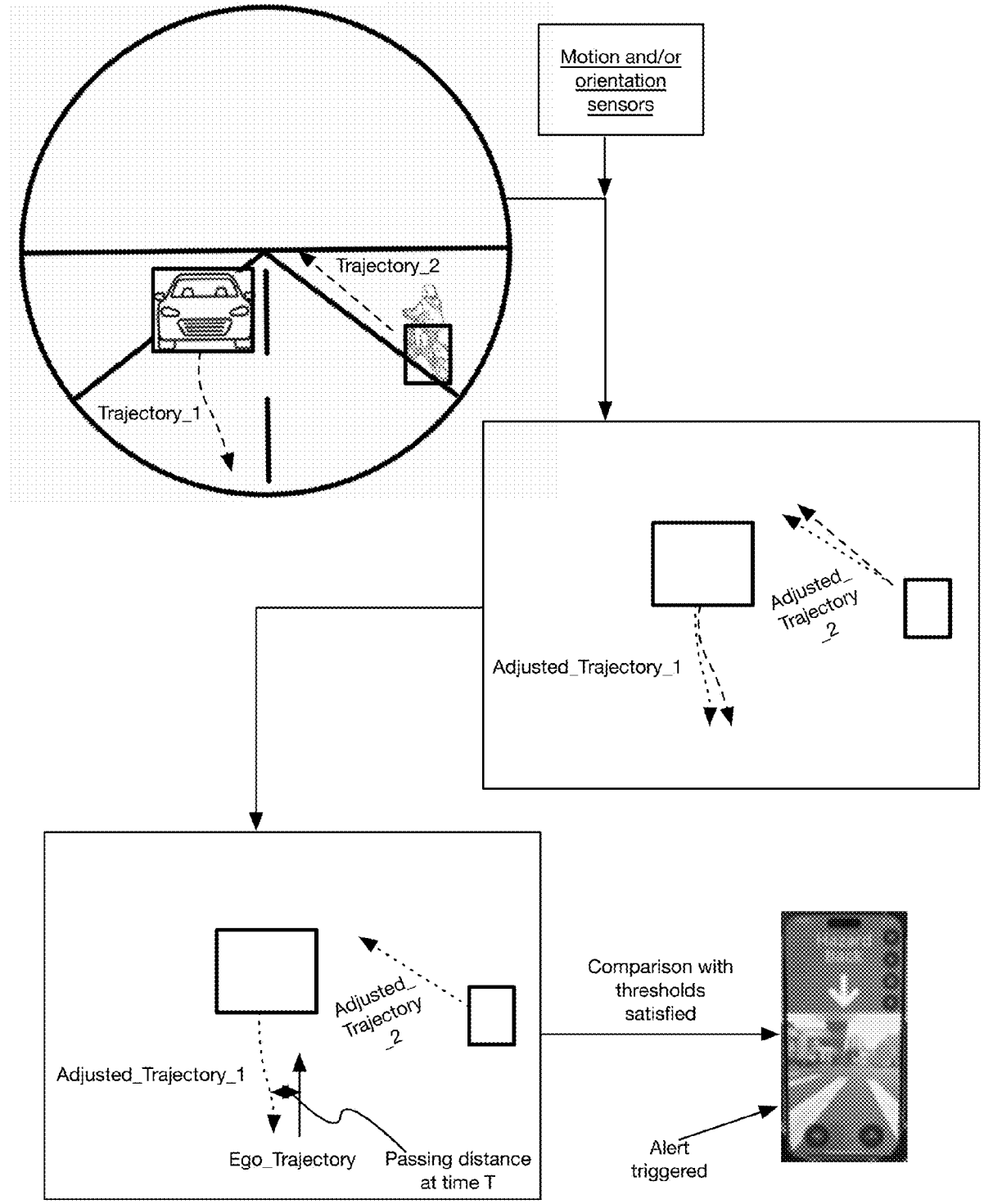

S300 can optionally include adjusting the object trajectories (e.g., as shown in FIGS. 11A-11B) based on sensor data collected in S100, and/or supplementary data associated with the ego and/or the environment, which can function to increase an accuracy of the objects' motion relative to the ego and thereby improve an accuracy of resulting alerts (e.g., preventing false negatives, preventing false positives, etc.). In some variants, for instance, motion and/or orientation information collected from the ego (e.g., a roll angle, a turning angle, an angular velocity reflecting a speed of turning, etc.) is used to adjust trajectories of objects in its environment. In examples, in an event that the ego is turning, the turning motion (e.g., angular velocity, radius of turn, etc.) can be compensated for in (e.g., subtracted from) the trajectories (e.g., locations along trajectory, motions along trajectory, etc.) of environmental objects. In specific examples, a turning velocity of the ego is subtracted from an angular velocity calculated for one or more objects detected in the ego's environment, which enables a determination of the object's true motion/trajectory to be determined, and further to enable a determination of which objects are heading toward the ego and how to provide accurate alerts in S500. For instance, in absence of such a process, it may appear that an object in the ego's environment moved or changed course when it was actually the ego's motion that resulted to the change. The adjustment can be performed after determining an initial trajectory, during production of the initial trajectory, and/or can occur at any other times.

In some examples, S300 is performed absent of determining (e.g., calculating) certain information about the ego (e.g., independent position, independent velocity, linear velocity, etc.), as relative motion between the ego and objects can be used to provide, with adequate accuracy, the alerts provided in S500.

Additionally or alternatively, S300 can include any other suitable processes.

4.4 Method—Determining a Scenario Based on the Analyzed Objects S400

The method 200 can include determining (e.g., predicting) a scenario of the environment based on the analyzed objects, which functions to assess whether or not the environment poses a potentially risky scenario for the bike and/or rider. Additionally or alternatively, S400 can function to determine a particular type of scenario, respond accordingly to the scenario and/or type, and/or can perform any other functions.

S400 is preferably performed in response to S300 (e.g., based on the trajectories), but can additionally be performed based on the depth parameters, object classifications and/or other intermediate information, and/or based on any other information.

S400 preferably includes predicting whether or not, for each object, its trajectory will result in it passing the ego, but can additionally or alternatively include: predicting whether or not the object will pass the ego within a predetermined distance; predicting at what time in the future the object will pass the ego; predicting whether or not the object will collide with the ego; and/or any other information. S400 can additionally include predicting features associated with a predicted passing, such as, but not limited to: a speed (e.g., speed of the object, relative speed between the object and the ego, etc.) associated with the passing; other motion features of the object involved in a predicted passing (e.g., acceleration of object at the time of passing, whether or not the object is braking or accelerating, etc.); and/or any other information.

In a preferred set of variants, based on the trajectory of each object, any or all of the following are calculated and are used in assessing the risk of the object: a prediction of whether or not the object is predicted to pass the ego; a prediction of the distance between the object and the ego at the time of passing; a time in the future that a passing is predicted to occur; and/or any other information can be determined.

To make a determination of a risk, S400 can include comparing any or all of the above parameters with a set of one or more thresholds. The thresholds can include any or all of: a distance threshold (e.g., where S400 includes determining and/or quantifying a risk if a passing distance between the object and the ego is below a predetermined threshold), a temporal threshold (equivalently referred to herein as a time threshold) (e.g., where S400 includes determining and/or quantifying a risk if a time until passing is below a predetermined threshold), a speed threshold (e.g., where S400 includes determining and/or quantifying a risk if a relative speed between the ego and object is above a predetermined threshold, such as at passing), an acceleration threshold (e.g., where S400 includes determining and/or quantifying a risk if an object is accelerating above a predetermined threshold, where S400 includes determining and/or quantifying a risk if a relative acceleration between the ego and object is above a predetermined threshold, etc.), and/or any other thresholds. In variants including multiple thresholds, the multiple thresholds can be considered independently (e.g., wherein a minimum number of satisfaction criteria need to be satisfied), together (e.g., considered in a weighted fashion, used to weight a value of the risk, etc.), and/or otherwise suitably considered.

The thresholds are preferably informed by, and optionally adjusted based on, rider feedback (e.g., corpus of rider feedback). Additionally or alternatively, any or all thresholds can be personalized to a particular user, and/or otherwise suitably determined. The thresholds can be predetermined, dynamically determined, or any combination.

In a preferred set of variants, S400 includes calculating a time of passing between an object and the ego, and a distance between the object and the ego at the time of passing, wherein each of these parameters is compared with a threshold. The passing distance threshold is preferably a maximum threshold (e.g., 3 meters, 3.5 meters, 2 meters, 1.5 meters, 1 meter, 0.75 meters, 0.5 meters, 0.25 meters, greater than 2 meters, less than 0.25 meters, any range bounded by these values, 24 inches, 18 inches, 12 inches, 6 inches, etc.), but can additionally or alternative be/include a minimum threshold and/or any other thresholds. The time threshold is preferably a maximum threshold (e.g., 10 seconds, 9 seconds, 8 seconds, 7 seconds, 6 seconds, 5 seconds, 4 seconds, 3 seconds, 2 seconds, 1 second, greater than 10 seconds, less than 1 second, etc.), but can additionally or alternative be/include a minimum threshold and/or any other thresholds. An action is preferably triggered in S500 in an event that the passing distance is below the distance threshold and the time of passing is below the time threshold, but can additionally or alternatively be otherwise triggered.

In some examples, S400 and/or S500 can include waiting to trigger an action until the time of passing is predicted to be within the time threshold; scheduling an action to be triggered based on a difference between the passing time and the time threshold; and/or any other processes.

Additionally or alternatively, any other thresholds can be used.

S400 can optionally, additionally or alternatively, be performed with a computer vision process, and further with a machine learning model (e.g., deep learning model, neural network, time series neural network, recurrent neural network [RNN], long short-term memory [LSTM] model, convolutional neural network [CNN], etc.), which is configured to assess the trajectories in order to determine a potential scenario involving the detected objects and the bike. Additionally or alternatively, S400 can be performed with classical machine learning, one or more rule-based and/or programmed processes, and/or any combination.

In such variants, the computer vision and/or alternative process is preferably trained with supervised learning and further preferably based on input from riders or other users with experience in similar environments (e.g., crowded urban environments), such that the manual input indicates whether or not that user would feel danger in the environment reflected in the data (and/or if a collision or near-miss is detected). Additionally or alternatively, the process can be trained with unsupervised learning, semi-supervised learning, and/or any combination. Alternatively, any or all of the process can be untrained.

In a preferred set of variations, for instance, S400 includes processing the set of trajectories (e.g., individually, collectively, etc.) with one or more computer vision algorithms, which are trained to detect any or all of a set (e.g., predetermined set) of scenarios.

The scenarios detected in S400 are preferably reflective of a risk of a collision between the detected object(s) and the bike, but can additionally or alternatively reflect any other unsafe or potentially unsafe scenario, and/or any other scenarios. Types of scenarios can include, for instance, any or all of: a potential collision and/or a potential type of collision, a near-miss collision, erratic driving motions, and/or any other scenarios. The detected scenario can optionally further be associated with a directionality and/or more set of features, such as a heading of the object relative to the rider, a type of collision that might occur (e.g., side swipe vs. T-bone), a time at which the collision might occur, a recommended action for the rider to take to avoid a potential collision, a predicted and/or potential severity of the scenario, and/or any other features. In some examples, for instance, the scenario indicates whether or not a potential collision would be: a rear approach/collision (e.g., detected object is heading toward a rear of the bike); a forward approach/collision (e.g., detected object is heading toward a front of the bike); a side approach/collision (e.g., T-bone, side swipe, etc.); a crowding of the rider (e.g., a front-back squeeze such as that caused by a forward vehicle slowing down and a rear vehicle speeding up, a front-back squeeze such as that caused by the distance between a vehicle ahead of the rider and a vehicle behind the rider decreasing and/or being below a threshold, etc.); and/or any other types of scenarios.

A scenario detected in S400 can optionally be of a type from a predetermined set of multiple types of scenarios. Additionally or alternatively, the output of S400 can include a binary indication of the environment (e.g., risky vs. not risky) such as a binary assessment of whether or not a potentially dangerous scenario is occurring and/or is predicted to occur. Further additionally or alternatively, S400 can produce as output a determination of a severity and/or likelihood associated with a dangerous scenario occurring (e.g., likelihood of a collision) and/or any other information. In some variations, for instance, any or all of these features and/or parameters can be used in determining a type of action to be triggered in S500, whether an action should be triggered in S500 (e.g., requires a likelihood exceeding a predetermined threshold), and/or can be used in any other way(s).

S400 can additionally or alternatively include any other suitable processes.

4.5 Method—Triggering an Action Based on the Scenario S500

The method 200 can include triggering an action based on the scenario S500, which functions to provide actionable information to the rider (and/or other users) based on the environmental understanding produced in the prior processes of the method 200.

S500 is preferably performed in response to detecting the occurrence of a scenario (e.g., dangerous scenario, scenario associated with a risk above a predetermined threshold, etc.), but can additionally or alternatively be otherwise triggered and/or performed.

Figure 8:
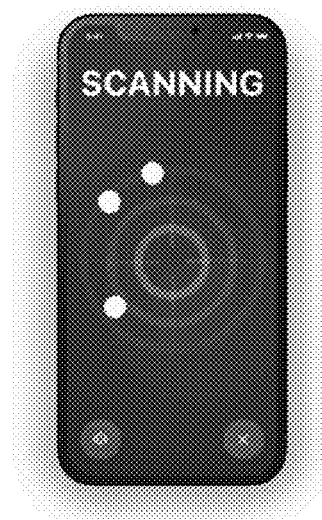
FIG. 8 depicts an example of a set of possible actions triggered in response to the method for producing a 3D environmental representation.
Figure 8:
Figure 8:
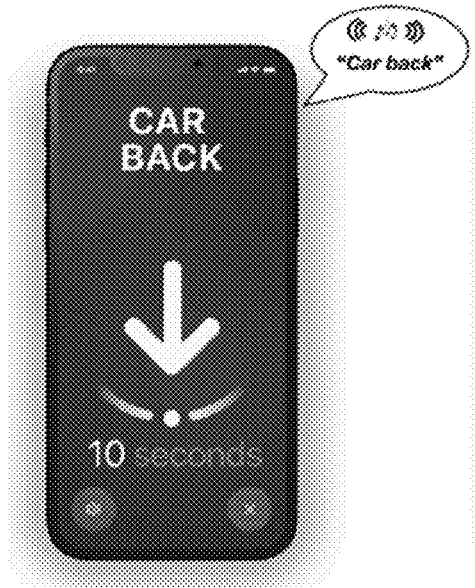
Figure 8:

The actions preferably include notifications and/or alerts provided at a user device and/or one or more output devices of the system, such as any or all of: an audio alert (e.g., of a particular sound and/or volume based on the type and/or location of the danger) produced at one or more speakers (e.g., of the user device, of supplementary speakers coupled to the vehicle and/or camera), a visual alert (e.g., display at a screen of the user device), and/or any other alerts. The alerts can optionally convey a directionality associated with the danger and relative to the rider (e.g., direction from which a dangerous object is coming), such as through any or all of: a visual direction provided to the user (e.g., as shown in FIG. 8), a location at which the audio output is provided (e.g., the location of the speaker which is played relative to other speakers, with a beamforming process, etc.), and/or with any other components and/or processes.

Figure 10A:
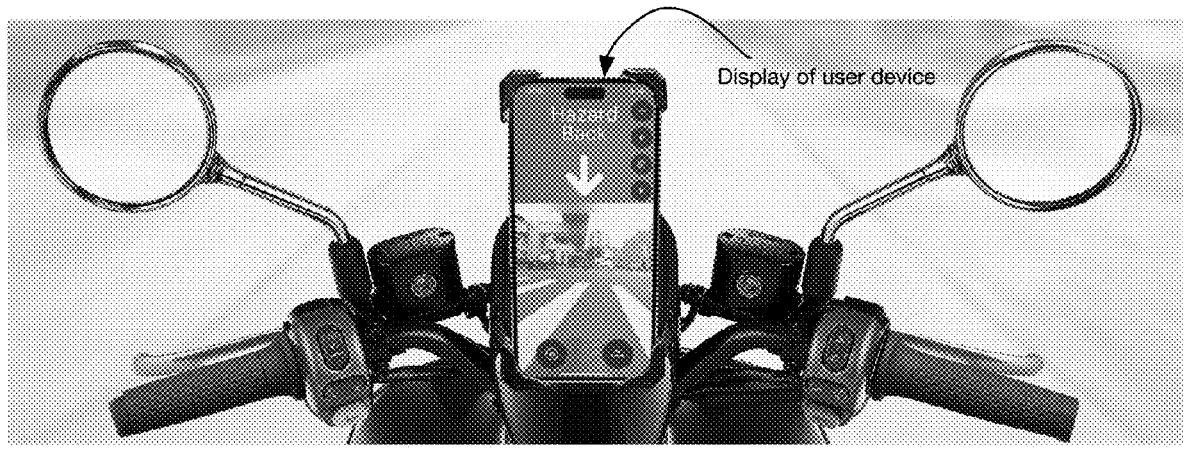
FIGS. 10A-10B depict an example of an alert displayed to an operator.
Figure 10B:
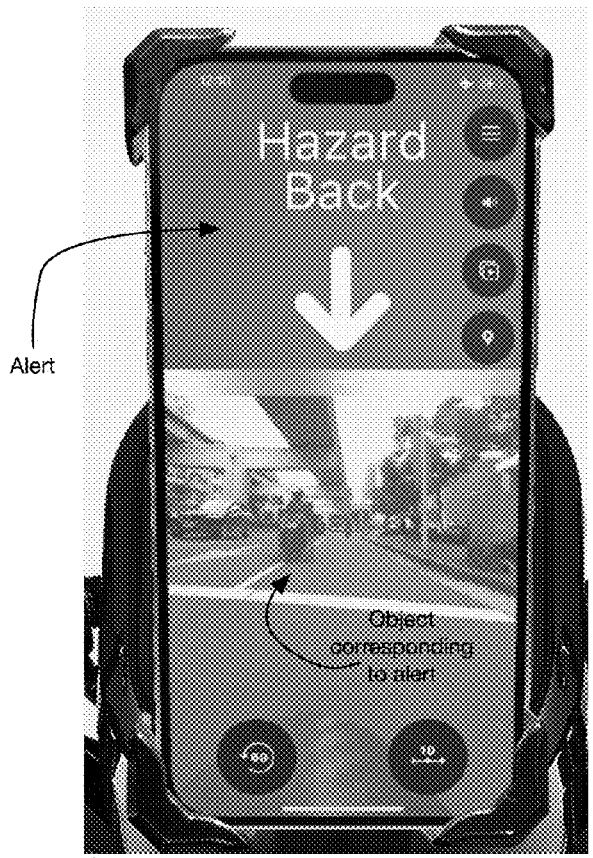

Additionally or alternatively (e.g., as shown in FIGS. 10A-10B), the alert can indicate, at a display of the user, the particular object (e.g., cyclist, car, etc.) that is causing the alert. In some variants, for instance, a bounding box visual directly obtained from S400 (e.g., bounding box, bounding box in a particular color, bounding box filled in, etc.), is overlaid on the video stream being shown to the user, which effectively outlines the object that is a risk to the operator.

Additionally or alternatively, any other suitable visuals can be provided (e.g., highlighting the object, etc.), such as an indication of which direction (e.g., in front of rider, behind rider, etc.) the object is approaching from, which direction the operator should look, and/or any other information.

In specific examples, an audio alert (e.g., noise, beep, etc.) is provided in combination with a visual indication.

The actions can additionally or alternatively include an automatic recording and/or transmission of sensor data, such as an automatic recording of video data at the time at which a danger is detected (e.g., until the danger subsides, until a predetermined time has passed, etc.) and/or a collision occurs. This can function, for instance, to provide the rider with evidence of a dangerous scenario (e.g., to report a potential incident, to report an actual incident, etc.). In some variations, for instance, S500 include automatically recording, tagging, and/or saving a portion of the video stream corresponding to the scenario as video evidence for the user (e.g., for use in an insurance claim).

Additionally or alternatively, the actions can include notifying other users (e.g., emergency services, nearby riders, etc.) and/or any other actions.

Additionally or alternatively, the method 200 can include any other suitable processes.

Figure 5:
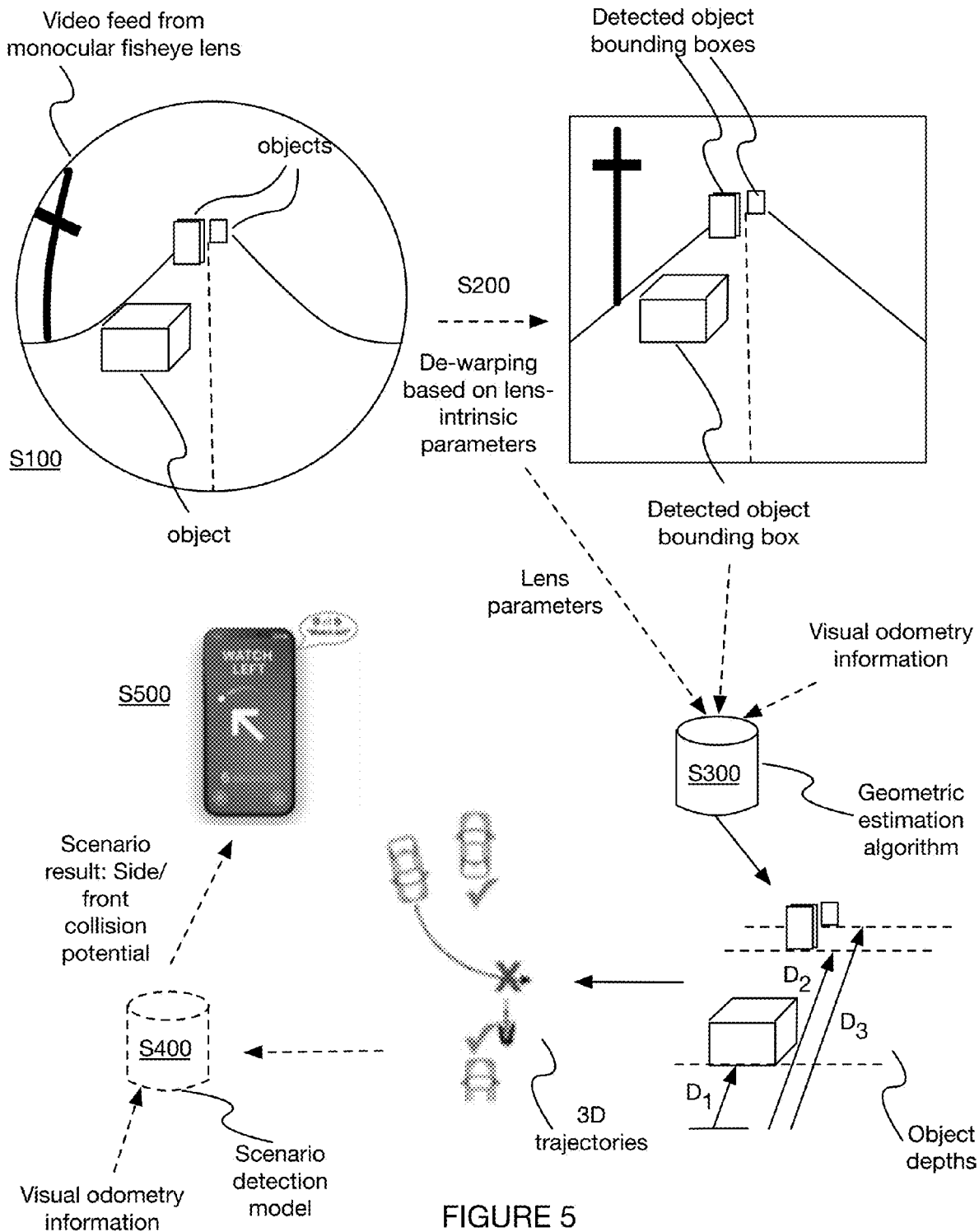
FIG. 5 depicts a variation of the method for producing a 3D environmental representation.

A variation of a method workflow is shown in FIG. 5.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-public transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-public transitory computer readable media, or any suitable device. The computer-executable component can include a computing system and/or processing system (e.g., including one or more collocated or distributed, remote or local processors) connected to the non-public transitory computer-readable medium, such as CPU, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for providing risk-based alerts to an operator of a 2-wheeled vehicle during a trip, the method comprising:
    at each of a set of times during the trip, collecting a sensor dataset, the sensor dataset comprising a set of images from a set of monocular cameras;
    for each of the set of times:
        producing a set of bounding boxes representing a set of objects in the set of images, each of the set of bounding boxes associated with a height;
        assigning an object type classification to each of the set of bounding boxes;
        determining a depth metric for each object of the set of objects based on:
            a set of intrinsic parameters associated with the set of monocular cameras;
            a height of the associated bounding box; and
            the object type classification of the associated bounding box;
        for each object, producing a predicted trajectory based on the depth metric determined for the object;
        for each object, calculating a future time and a future distance with which the object will pass the 2-wheeled vehicle based on the predicted trajectory;
        in an event that, for at least one object of the set, the future time is below a time threshold and the future distance is below a distance threshold, triggering an alert to the operator.

2. The method of claim 1, wherein the sensor dataset further comprises an angular parameter from a set of inertial measurement units coupled to the 2-wheeled vehicle, wherein the method further comprises adjusting the predicted trajectory based on the angular parameter.

3. The method of claim 2, wherein the angular parameter is an angular acceleration.

4. The method of claim 3, wherein the method further comprises calculating an angular velocity based on the angular acceleration and adjusting the predicted trajectory based on the angular velocity.

5. The method of claim 1, wherein the 2-wheeled vehicle is one of a bicycle, a moped, a motorcycle, or a scooter.

6. The method of claim 1, wherein processing the 1$^{st}$ set of data is performed in absence of detecting a set of contextual scene features associated with the set of images, wherein the set of contextual scene features comprises: a set of lane lines, a horizon, and a vanishing point.

7. The method of claim 1, wherein the depth metric for each object is determined based on information consisting essentially of: the set of intrinsic parameters associated with the set of monocular cameras; the height of the associated bounding box; and the object type classification of the associated bounding box.

8. The method of claim 1, wherein the set of intrinsic parameters comprises at least one of: a focal length, field-of-view, resolution, or aperture.

9. The method of claim 1, wherein the time threshold is between 2 and 10 seconds.

10. The method of claim 9, wherein in an event that the future distance is below the distance threshold and the future time is above the time threshold, the method further comprises waiting to trigger the alert.

11. The method of claim 9, wherein the distance threshold is between 0.25 meters and 1 meter.

12. The method of claim 1, wherein the depth metric is determined based on an algorithm, wherein the algorithm prescribes an inverse linear relationship between the height of the associating bounding box and the depth metric.

13. A system for providing risk-based alerts to an operator of a 2-wheeled vehicle during a trip, the system comprising:
    a set of sensors coupled to the 2-wheeled vehicle, the set of sensors comprising a set of monocular cameras;
    a processing subsystem in communication with the set of sensors, configured to:
        at each of a set of times during the trip, collect a sensor dataset from the set of sensors, the sensor dataset comprising a set of images from the set of monocular cameras;
        for each of the set of times:
            produce a set of bounding boxes representing a set of objects in the set of images, each of the set of bounding boxes associated with a height;
            assign an object type classification to each of the set of bounding boxes;
            determine a depth metric for each object of the set of objects based on:
                a set of intrinsic parameters associated with the set of monocular cameras;
                a height of the associated bounding box; and
                the object type classification of the associated bounding box;
            for each object, produce a predicted trajectory based on the depth metric determined for the object;
            for each object, calculate a future time and a future distance with which the object will pass the 2-wheeled vehicle based on the predicted trajectory;
            in an event that, for at least one object of the set, the future time is below a time threshold and the future distance is below a distance threshold, trigger an alert to the operator at a user interface.

14. The system of claim 13, wherein the set of monocular cameras comprises at least 2 monocular cameras.

15. The system of claim 13, wherein the set of sensors further comprises a set of inertial measurement units, wherein the processing subsystem is further configured to adjust the predicted trajectory based on data collected from the set of inertial measurement units.

16. The system of claim 13, wherein the 2-wheeled vehicle is one of a bicycle, a moped, a motorcycle, or a scooter.

17. The system of claim 13, wherein processing the 1$^{st}$ set of data is performed in absence of detecting a set of contextual scene features associated with the set of images, wherein the set of contextual scene features comprises: a set of lane lines, a horizon, and a vanishing point.

18. The system of claim 13, wherein the time threshold is between 2 and 10 seconds.

19. The system of claim 18, wherein the distance threshold is between 0.25 meters and 1 meter.

20. The system of claim 18, wherein in an event that the future distance is below the distance threshold and the future time is above the time threshold, the processing subsystem is configured to wait to trigger the alert.

\* \* \* \* \*